United States Patent
Zheng

(10) Patent No.: US 6,692,088 B1
(45) Date of Patent: Feb. 17, 2004

(54) BOUNDARY SELF-ADAPTATION SCHEME FOR PROPORTIONAL POPPET VALVE PRESSURE CONTROL

(75) Inventor: Yuhong Zheng, Ann Arbor, MI (US)

(73) Assignee: Kelsey-Hayes Company, Livonia, MI (US)

( * ) Notice: Subject to any disclaimer, the term of this patent is extended or adjusted under 35 U.S.C. 154(b) by 111 days.

(21) Appl. No.: 09/965,103

(22) Filed: Sep. 26, 2001

Related U.S. Application Data

(63) Continuation-in-part of application No. 09/919,445, filed on Jul. 31, 2001.

(51) Int. Cl.[7] .................................................. B60T 8/34
(52) U.S. Cl. .................................... 303/113.1; 303/115.2
(58) Field of Search .......................... 303/113.1, 113.4, 303/113.3, 115.2, 114.1, 155, 166, 157, 158, 84.1, 84.2, 119.1; 701/70, 71

(56) References Cited

U.S. PATENT DOCUMENTS

| | | | | |
|---|---|---|---|---|
| 5,545,929 A | * | 8/1996 | Fijioka et al. | 303/113.4 |
| 5,560,688 A | | 10/1996 | Schappler et al. | |
| 5,636,910 A | * | 6/1997 | Kost et al. | 303/155 |
| 5,669,678 A | * | 9/1997 | Stumpe et al. | 303/113.4 |
| 5,727,854 A | * | 3/1998 | Pueschel et al. | 303/155 |
| 5,782,541 A | * | 7/1998 | Schappler | 303/15 |
| 5,806,938 A | * | 9/1998 | Stumpe et al. | 303/113.4 |
| 5,941,608 A | | 8/1999 | Campau et al. | |
| 6,030,055 A | | 2/2000 | Schubert | |
| 6,086,167 A | | 7/2000 | Heckmann et al. | |
| 6,161,907 A | * | 12/2000 | Luckevich et al. | 303/158 |
| 6,364,429 B1 | * | 4/2002 | Roden et al. | 303/115.2 |
| 6,456,921 B1 | * | 9/2002 | Bodie et al. | 701/70 |

FOREIGN PATENT DOCUMENTS

| | | |
|---|---|---|
| DE | 36 36 140 | 4/1988 |
| DE | 38 33 881 | 4/1990 |
| DE | 199 36 269 | 2/2001 |
| DE | 102 00 771 | 8/2002 |
| EP | 0 233 360 | 8/1987 |
| WO | 02/26540 | 4/2002 |

OTHER PUBLICATIONS

SAE Technical Paper #950762, Intelligent Braking for Current and Future Vehicles, Donald Schenk, et al.
SAE Technical Paper #960991, Electrohydraulic Brake System—The First Approach to Brake–By–Wire Technology, Wolf–Dieter Jonner, et al.

* cited by examiner

Primary Examiner—Christopher P. Schwartz
Assistant Examiner—Melanie Torres
(74) Attorney, Agent, or Firm—MacMillan, Sobanski & Todd, LLC

(57) ABSTRACT

A method of boundary self-adaptation for proportional poppet valve pressure control comprises implementing an estimator to estimate a boundary deviation of the valve. Then, a pressure command signal is detected. Next, a pressure command derivative over time is obtained. Then, determining which closing boundary should be updated is decided based on the sign of the pressure command derivative. Next, a pressure error is obtained by subtracting an actual wheel brake pressure from its pressure command. Then a modified pressure error is calculated. Next, a pressure command signal is evaluated to determine whether a braking maneuver is gentle. Next, the modified pressure error is implemented in the estimation. Finally, a boundary table is updated using the resultant boundary deviation estimate.

12 Claims, 4 Drawing Sheets

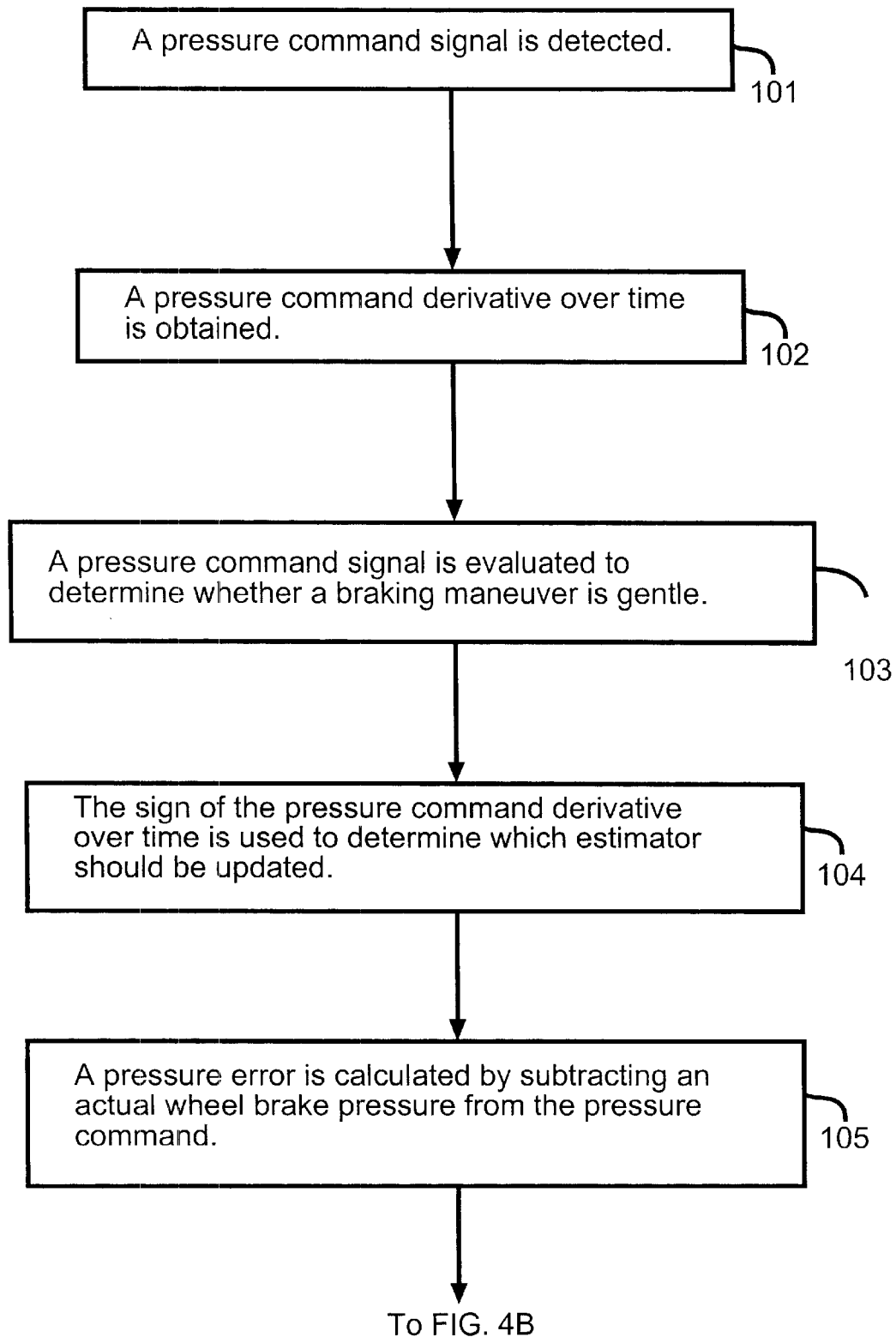

BOUNDARY SELF-ADAPTATION SCHEME FOR PROPORTIONAL POPPET VALVE PRESSURE CONTROL

CROSS REFERENCE TO RELATED APPLICATIONS

This application is a continuation-in-part of pending application Ser. No. 09/919,445 filed Jul. 31, 2001, assigned to the assignee of this application, the disclosure of which is incorporated herein by reference.

BACKGROUND OF THE INVENTION

This invention relates in general to proportional poppet valve control and, in particular, to a self-adaptation scheme for poppet valves in an electrohydraulic brake system. Poppet valves can be used in electrohydraulic brake systems to control the pressure of brake fluid applied to vehicle wheel brakes.

Traditionally, proportional poppet valves are operated in a manner proportional to the voltage applied to the valve's controlling solenoid. The valves are either closed, opened, or are in some intermediate position. Normally this prevents or allows a fluid to pass from one side of the valve to the other. As it relates to this invention, valves either allow or prevent hydraulic fluid flow in a hydraulic circuit, specifically in a hydraulic circuit in a brake system. An electrohydraulic braking (EHB) system utilizes electronically controlled valves, pumps, or a combination thereof to augment, replace, or control the base braking operation of a vehicle brake system. Base braking, sometimes referred to as foundation braking, is the basic braking called for by the operator of a vehicle. In base braking, the brake pedal operates a master cylinder, causing the master cylinder to send pressurized hydraulic brake fluid to the wheel brakes of a vehicle. Advanced braking systems, such as EHB systems, have been used to improve the performance of vehicle braking systems by augmenting or replacing the base braking function with other braking operations.

One of the first of many advanced braking functions that has been developed for vehicles was an Antilock Braking System (ABS), which typically involves the operation of valves and pumps to selectively release and re-apply brakes during a braking operation. While typical base braking is commanded by the operator, ABS braking controls the vehicle brakes to recover from and limit skidding of a vehicle's wheels due to braking the wheels harder than permitted by the available coefficient of friction of the road surface. Since pumps and valves are electronically controlled to augment the base braking operation, a vehicle equipped with ABS may generally be said to have an EHB system.

Another advanced braking function that may be accomplished by a properly configured EHB system is VSC (Vehicle Stability Control), which is a system for selectively actuating vehicle brakes to improve the stability of a vehicle during vehicle maneuvers. Other braking applications producing a pressure command input to the present invention include DRP (Dynamic Rear Proportioning—a system for controlling the front to rear proportioning of a vehicle braking command), TC (Traction Control—which typically involves selective application of brakes during vehicle acceleration to recover from and limit skidding of a vehicle's wheels due to accelerating the wheels faster than permitted by the available coefficient of friction of the road surface), ACC (Autonomous Cruise Control—a cruise control system that can actuate vehicle brakes to maintain proper vehicle spacing relative to a vehicle in front) and similar finctions.

A subset of electrohydraulic braking systems is electronic brake management (EBM). EHB systems can allow braking to be primarily controlled by the vehicle driver with a conventional master cylinder system. Additionally, an electronically controlled portion of the system operates the brakes under certain conditions, i.e. anti-lock, traction control, etc. In Electronic Brake Management systems, primary braking is controlled electronically. In an EBM system, the vehicle driver or a safety system generates an electronic signal, which in turn operates the pumps and valves to achieve a braking pressure within the system. A pedal simulator creates the effect for the driver of applying direct braking pressure while also providing a back-up braking system in case of a failure of the primary system. In the back-up system, the pedal simulator acts as a master cylinder during the failure event and provides the hydraulic pressure that actuates the brakes.

Regardless of the type of electrohydraulic braking system that is used, a system with proportional poppet valves has a control process that controls whether the valves are opened, closed or intermediately positioned. In order for a control system to properly control the poppet valves, it must be configured to account for the forces acting on the valves, the natural characteristics of the valves and be able respond to changes in the valve during braking operations.

Proportional poppet valves used in the above-described systems typically comprise a valve armature, a valve seat, and a spring. If an electric current controls the valve, there generally is a solenoid that acts upon a magnet causing the valve armature to be raised from or seated upon the valve seat. Because a valve can be normally open or normally closed, there are different forces acting upon the valve in its default position. Generally, such forces can be a magnetic force, a spring force, an inlet pressure force, or an outlet pressure force. The inlet and outlet pressure forces will ordinarily vary depending upon the load demanded within the system. In that voltage is proportional to current, it is understood that the use of current controls are to be within the scope of the claims of the present invention.

To balance the forces that are naturally occurring on the valve, so that a particular valve is either normally opened or normally closed, the closing boundary must be determined. A closing boundary also compensates for deadband in the system. Deadband compensation is used to reduce delays in valve response to an applied voltage when the valve is in its normal position. In proportional poppet valve pressure controls, a closing boundary is defined as the minimal (for normally open valves) or maximal (for normally closed valves) voltage required to keep an armature assembly in contact with the seat. Closing boundary data, as used for deadband compensation, gives minimal ramp lags but is dependent on how accurately the closing boundary is set. Several factors make it difficult to accurately set the closing boundary under all operating conditions. First, it is difficult to accurately measure the closing boundary. Second, the actual closing boundary changes in a time-variant manner due to operating pressure, temperature and potentially other naturally occurring phenomena. Lastly, the actual boundary varies from one valve to another because of manufacturing tolerances. Proportional poppet valve pressure control systems are very sensitive to inaccuracies in the closing boundary. This high sensitivity can be justified by the fact that poppet valve systems have a far smaller effective control band at a given pressure than systems with spool valves. Another difference between the two-valve system and the one-valve system is that the two-valve system utilizes an apply valve and a release valve to modulate the brake pressure at each wheel. Therefore, boundary variations in any one of the two valves can affect braking performance at a wheel.

One method that can be used to account for variations in multiple valves at one time is a lump-sum method. However, there is a limitation in using lump-sum estimation of boundary variation. The lump-sum approach generally achieves good pressure tracking performance but the system could converge to equilibrium where one valve is not closed while the other is supposed to be open. The degree of the problem in such a system varies with the amount of boundary variation. Another drawback is that given non-linearities in flow gain at a given pressure, the lump-sum effect of boundary variations in two valves would change rapidly whenever there is a change in the valve state (open and closed). As a result, every time there is a change in the valve state, transients are induced.

To exhibit ideal performance in a system, each valve would have to be trimmed individually to match the closing boundary. This individualized tailoring process is time-consuming and expensive to conduct for a mass-produced system. Therefore, it is important to devise a boundary self-adaptation scheme to produce the system in a cost-effective manner.

U.S. Pat. No. 6,086,167 to Heckmann, et al. describes a method and device for regulating wheel brake pressure. Pressure is regulated by a regulator generating a driving signal quantity for a pressure-influencing valve arrangement on the basis of the active operating point of the valve arrangement. Given a pressure differential across the valve arrangement, the operating point can be determined from a predetermined current-pressure characteristic curve. The characteristic curve essentially defines a point (at or near zero flow) from which up or down hydraulic flow is utilized to regulate wheel brake pressure. The boundary addressed in the present invention is the watershed between hydraulic bulk flow and leakage flow, both of which are utilized for wheel brake pressure control.

U.S. Pat. No. 6,030,055 to Schubert improves upon the quality of the pressure control system described in U.S. Pat. No. 6,086,167 and makes manual determination and adjustment of the characteristic curves unnecessary. Primarily, Schubert's invention is based upon the alternative exemplary embodiment of U.S. Pat. No. 6,086,167, where a regulator based on pressure difference between reference pressure and actual wheel brake pressure outputs a pressure correction quantity to the reference pressure, and the corrected reference pressure in turn is used to find activation current from the current-pressure characteristic curve. Schubert describes a process that automatically equalizes the correlation between the pressure difference at a valve and the activation current. The correction quantity occurring in the course of a regulation operation is held within defined limits by appropriate adaptation of the characteristic curves. The limits of the correction quantity are determined as a function of the actual wheel brake pressure and the dynamic ratio of the reference pressure. The characteristic curve for the apply valve is modified during pressure buildup and the characteristic curve for the release valve is modified during pressure reduction.

An estimation approach that estimates boundary deviation should disregard performance changes due to other factors. A system that does disregard such other factors would be beneficial in achieving consistent and convergent estimation. Therefore, an estimation approach based on a different philosophy than that of the patents listed above would provide a more accurate response to a pressure command signal. Consistent estimation would in turn help generate consistent pressure control performance for different types of pressure commands.

SUMMARY OF THE INVENTION

This invention relates to a method for adapting a closing boundary for a proportional valve comprising implementing an estimator including an integral element to estimate boundary variations of the valve. This entails using the sign of the pressure command derivative over time to determine which one of the two estimators for a wheel should be updated. Next a modified pressure error is calculated in such a way that steady state pressure error, resulting from feed-forward term mismatch, control deadzone, and other factors, is subtracted from measured pressure error. Finally, the modified pressure error is used as the input to the estimators and the boundary table is updated using the resultant boundary deviation estimates.

The proposed boundary self-adaptation scheme implements two estimators including an integral element that are used to estimate the boundary variations of two valves at each of several channels. Each channel can represent a wheel brake in a hydraulic circuit. The sign of the pressure command derivative over time is used to determine which estimator should be updated. When the pressure command derivative over time is positive, the apply estimator would be updated and the release estimator left unchanged. When the pressure command derivative over time is negative, the apply estimator is ignored and the release estimator is updated. A modified pressure error is calculated and is then used in the estimation. The steady state pressure error resulting from mismatched feedforward term, control deadzone and other factors are then subtracted from the measured pressure error. The only error that remains after completion of the above-described correction process, is the error due to boundary deviation. The boundary deviation error is then used to update the boundary table. Gain scheduling is used in the estimators to deal with potential asymmetry in mapping from boundary deviation to modified pressure error. To avoid transients and integral wind-up, the estimators are updated during gentle braking maneuvers. Finally, the whole pressure region is partitioned into segments with one state variable associated with each segment. The values of state variables are in turn used in computing control commands at the corresponding segments.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
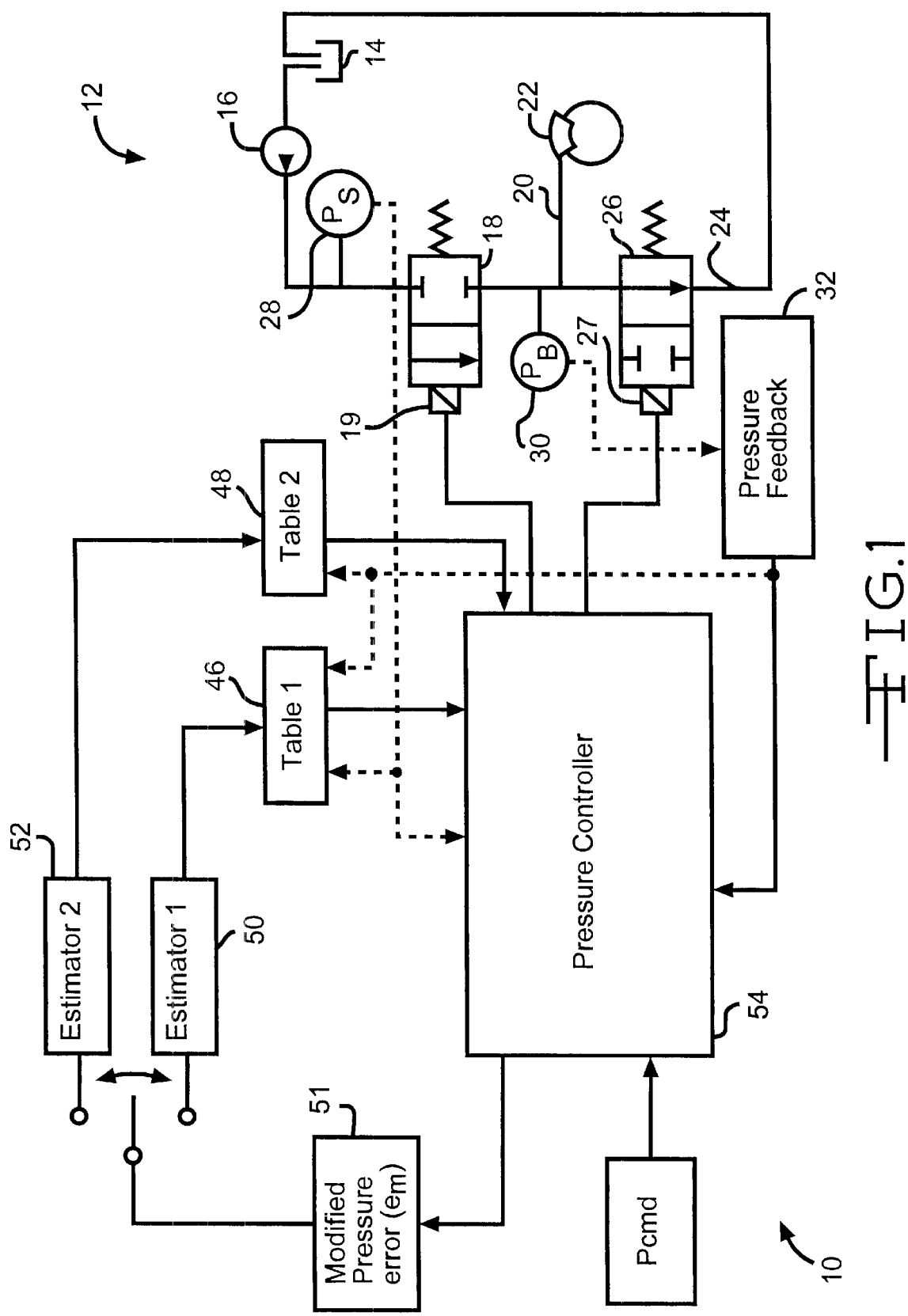
FIG. 1 is a simplified schematic view of a vehicle braking system including a portion of the system electronic controls and boundary adaptation controls therefore.

Referring now to the drawings, there is illustrated in FIG. 1 a portion 10 of the electronic circuitry processing braking signals that implements a pressure control algorithm with a greatly simplified schematic representation of a typical EHB braking system 12. The portion 10 of the electronic circuitry also includes the estimators 50, 52 of the present invention. The estimators 50, 52 can also include an integral element.

The simplified EHB system 12 includes a fluid reservoir 14. A pump 16 pumps hydraulic brake fluid from the reservoir 14. The pump 16 (typically complemented by a high-pressure accumulator, not shown) supplies pressurized hydraulic brake fluid to an apply valve 18, which is preferably implemented as a normally closed solenoid operated poppet valve. When the apply valve 18 is opened, pressurized hydraulic brake fluid passes through the apply valve 18, and flows through a conduit 20 to a vehicle wheel brake 22. A fluid conduit 24 is connected to the conduit 20 between the wheel brake 22 and the apply valve 18, and provides a return path for hydraulic brake fluid from the wheel brake 22 to the reservoir 14. A normally open solenoid 27 operated release valve 26 is disposed in the fluid conduit 24 to control the flow of hydraulic brake fluid through the fluid conduit 24.

The flow through the apply valve 18 and release valve 26 is controlled by the pressure controller 54 based on an input signal of the pressure commanded by the user of the EHB braking system 12. A pressure command signal, $P_{cmd}$, can originate from a vehicle driver, or by a signal generated by an EHB system as described above. The signal is then processed in the pressure controller 54 to output a voltage necessary to obtain the demanded flow. Look-up table factors (voltage), represented by Voltage Boundary Table1 46 and Voltage Boundary Table2 48, are implemented in the pressure controller 54 to adjust the voltage applied across the valves (apply valve 18 or release valve 26) based on pre-existing forces on the valve. The look-up tables 46, 48 give the voltages necessary to take the valves 18, 26 from a de-energized state to ajust-closed position given the existing pressure differential. The just-closed position is where the valves 18, 26 are closed and the seat force is zero. For the apply valve 18, the pressure differential is established by considering the supply pressure 28 minus the wheel brake pressure 30 ($P_s-P_b$). For the release valve 26, the pressure differential is the same as the wheel brake pressure 30 ($P_b$) because the pressure in the fluid reservoir is approximately zero. The de-energized state for the apply valve 18 is normally closed and the de-energized state for the release valve 26 is normally open. Voltage Boundary Table1 46 supplies the voltage values to be used when voltage is applied to the apply valve 18 and Voltage Boundary Table2 48 supplies the values respective to the release valve 26. The voltage values for the voltage boundary tables 46, 48 account for pre-load forces from a spring connected to the valve armature and the pressure differential force across the valve 18, 26. The voltage values for the voltage boundary tables 46, 48 will be determined based on experimentation, the natural characteristics of a particular valve and the operating conditions. Since each valve in actual use will have different natural characteristics due to manufacturing, installation and other factors, the table voltage values will need to be updated based on those natural characteristics.

The table voltage values are updated based on system response to the pressure command signal as described below. The amount the table voltage values are updated is estimated based on the modified error between the pressure command signal and the actual pressure realized by activation of the valve. The amount of the modified pressure error, $e_m$, is determined from information within the pressure controller 54. One of the estimators 50, 52 will act to compensate for the modified pressure error. The output of the estimator 50, 52 then updates the table voltage values by increasing or decreasing the table voltage values.

Figure 2:
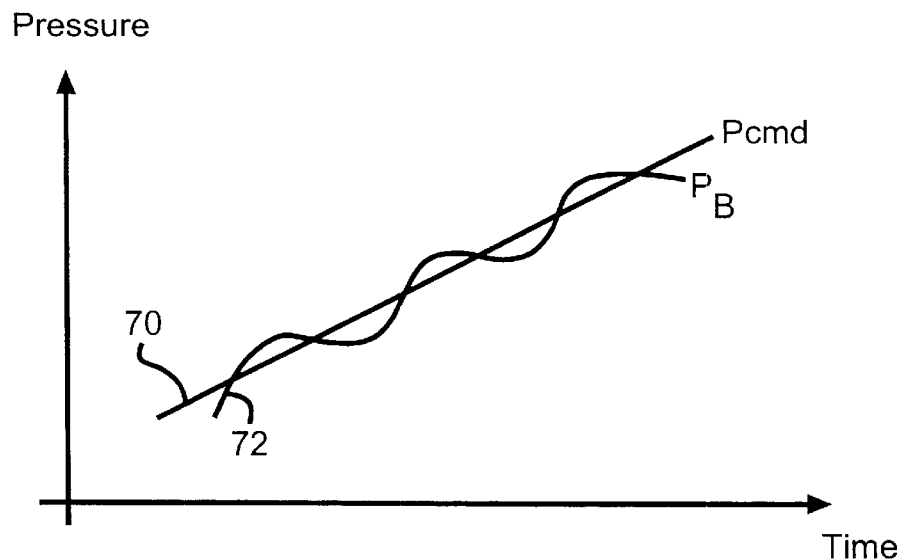
FIG. 2 is a graphical comparison of a constantly increasing $P_{cmd}$ signal with an over-compensated deadband for an apply valve.

Only one estimate should be updated at a time. There are several conditions that can be used to determine whether an estimator should be updated. The first condition is based on the polarity of the brake pressure derivative over time. That is to enable the apply estimator if the brake pressure derivative over time is greater than zero ($\dot{P}_b>0$) and enables the release estimator if the brake pressure derivative over time is less than zero ($\dot{P}_b<0$). However, there are several drawbacks to using this condition to determine whether to update the estimators. First, brake pressure is generally noisy and also prone to disturbances, especially in a closed-loop system. This allows small variations due to noise to cause the estimators to update. Second, if one of the boundary curves over-compensates the deadband, oscillations in the brake pressure due to the aggressive boundary setting would provide false information on the other boundary of the wheel. This can be seen in FIG. 2. In FIG. 2, the curve 70 represents a pressure command signal with a constant rise rate. Curve 72 represents a brake pressure signal with an aggressive or over-compensated response from an apply valve 18. The oscillations above and below curve 70 demonstrate an overly aggressive apply boundary setting. Therefore, while only the apply valve 18 is supposed to be active to accommodate the rising pressure command signal, a release valve 26 would also be active when the braking pressure curve 72 overshoots the pressure command curve 70. This would cause table voltage values for both valves 18, 26 to update when only the apply valve 18 should be considered. Finally, it is hard to distinguish between transients and a steady state with an aggressive boundary curve.

A second condition under which one estimate should be updated is based on whether the corresponding valve 18, 26 is commanded to be active. This results in essentially the same result as the first condition, described above. Oscillations due to one aggressive boundary curve provide false information on the other boundary of the wheel. The curves shown in FIG. 2 again represent this condition.

In the present invention, the polarity of the pressure command derivative over time is used to determine whether to update the estimators 50, 52. That is, to enable the apply estimator 50 if the pressure command derivative over time is greater than zero ($\dot{P}_{cmd}>0$) and enable the release estimator 52 if the pressure command derivative over time is less than zero ($\dot{P}_{cmd}<0$), regardless of the actual state of the respective valve 18, 26. This strategy is the most effective because the apply valve 18 is supposed to be active whenever brake pressure buildup is requested ($\dot{P}_{cmd}>0$) and the release valve 26 is supposed to be active whenever brake pressure reduction is requested ($\dot{P}_{cmd}<0$). If the rate of change in pressure command is positive, then the apply valve is active so that there can be an increase in braking pressure. This is also demonstrated in FIG. 2. The slope of curve 70 indicates an increasing pressure command signal. The slope of the curve, $\dot{P}_{cmd}$, is therefore also positive. The opposite is also true. If the rate of change in pressure command is negative, then the release valve 26 is active so that there can be a decrease in braking pressure. Violations of this system would indicate deadband over-compensation for the valve that is supposed to be active. In the case of deadband under-compensation, the result of the system operation would be similar to that under the first condition, as described above. However, in the case of deadband over-compensation, the strategy of the present invention allows correction even while a valve 18, 26 is inactive.

Figure 3:
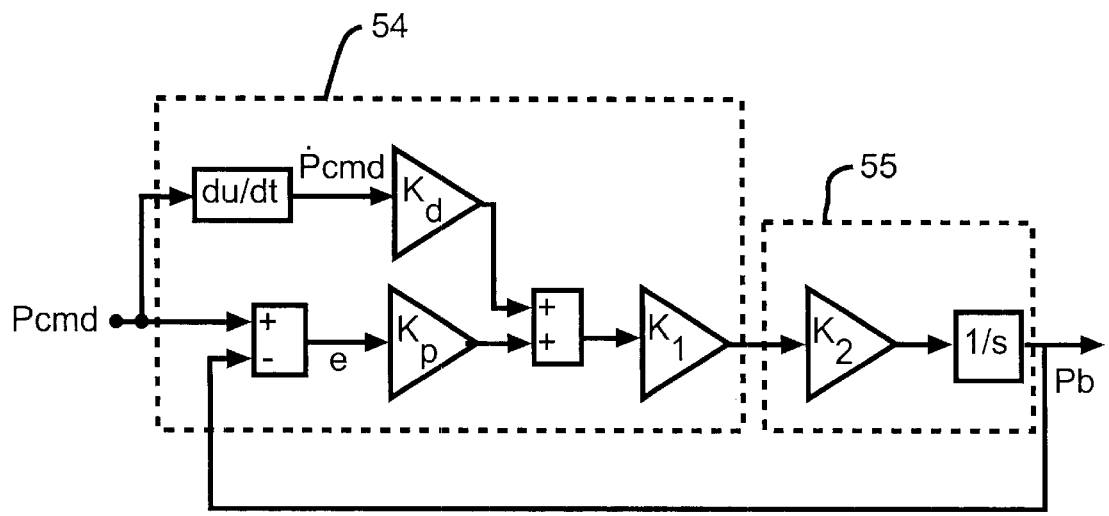
FIG. 3 is a schematic diagram of a simplified closed-loop pressure control system that processes an output brake pressure based on the demanded brake pressure in the absence of a boundary deviation.

For the purpose of the present invention, an integral element is included in the preferred algorithm used to estimate boundary deviation from the nominal boundary. However, pressure error between the pressure command and wheel brake pressure is not used directly in the estimators, as is the case with the invention disclosed in U.S. Pat. No. 6,030,055 to Schubert. Instead, a modified pressure error is used such that pressure error resulting from other factors, including a mismatched feedforward term and a control deadzone, is excluded. Because integration is part of the respective estimators 50, 52, the boundary estimate will converge to a point where the modified pressure error is zero but pressure error is not zero. The difference between pressure error and modified pressure error is a function of the pressure command derivative over time, control deadzone and any other factors. The use of modified pressure error in the estimator helps achieve a consistent boundary estimate and therefore consistent pressure control performance for different types of pressure commands. FIG. 3 exemplifies a method of calculating modified pressure error. The process is illustrated in a simplified closed-loop pressure control system with perfect boundary match.

In FIG. 3, $P_{cmd}$ and $P_b$ represent the pressure commanded by the braking system 12 and the brake pressure actually realized by the braking system 12, respectively. The simplified physical system, with voltage as its input and wheel brake pressure as its output, consists of gain factor $K_2$ and integral element "1/s". The gain factor $K_2$ represents lump-sum physical gain from the voltage to the wheel brake pressure $P_b$, and the integral element "1/s" denotes the dominating dynamic relationship for the simplified system. The simplified controller, with pressure command $P_{cmd}$ and wheel brake pressure $P_b$ as inputs and voltage as output, is composed of a proportional feedback control and a derivative feedforward control. The proportional gain for the proportional feedback control, $K_p$, acts on the pressure error e between the pressure command $P_{cmd}$ and the wheel brake pressure $P_b$. The derivative gain for the derivative feedforward control, $K_d$, acts on the pressure command derivative over time. Finally gain factor $K_1$, which acts on the sum of the proportional feedback control output and the derivative feedforward control output, should be set to $K_2^{-1}$. When $P_{cmd}$ has a constant ramp rate, the steady state pressure error, $e_{ss}$, is represented by the following equation:

$$e_{ss} = \frac{(K_1 K_2)^{-1} - K_d}{K_p} \dot{P}_{cmd}$$

In the case where $K_1 K_2 = 1$, which represents that there is perfect gain match, the modified steady state error can be made equal to zero by subtracting the following steady state pressure error, $e_{ss}$, from pressure error e:

$$e_{ss} = \left(\frac{1 - K_d}{K_p}\right) \dot{P}_{cmd}$$

Therefore, the modified pressure error $e_m$ is as follows:

$$e_m = \frac{Q_{dem} - \dot{P}_{cmd}}{K_p}$$

In the equation above, $Q_{dem} = K_p e + K_d \dot{P}_{cmd}$. If control deadzone is defined as both valves 18, 26 being inactive when $Q_{dem} \in$ (−switch, +switch), then the modified pressure error, $e_m$, is as follows:

$$e_m = \begin{cases} \min\left\{\dfrac{Q_{dem} - \text{switch}}{K_p}, \dfrac{Q_{dem} - \dot{P}_{cmd}}{K_p}\right\} \\ \max\left\{\dfrac{Q_{dem} + \text{switch}}{K_p}, \dfrac{Q_{dem} - \dot{P}_{cmd}}{K_p}\right\} \end{cases}$$

The first equation, above, represents the modified pressure error for the apply estimator. The second equation is for the release estimator. The first term in the min/max function, described above, is used to accommodate the control deadzone, such that integral wind-up would not result. It should be noted that the formula introduced in the example is not meant to limit the way that modified pressure error can be calculated, and the block diagram shown in FIG. 3 is not meant to restrict the scope of closed-loop pressure control strategy.

In practice, it is not practical to assume that $K_1 K_2 = 1$ over the whole pressure range of valve operations. If there is a mismatch in the gain, the mismatch can be viewed as a boundary deviation from the perspective of the estimators 50, 52. Additionally, these perceived boundary variations will be proportional to $\dot{P}_{cmd}$. To minimize the effect of these perceived boundary variations the estimators 50, 52 are updated only at low $|\dot{P}_{cmd}|$ (i.e. during gentle braking maneuvers). By updating the estimators only at low $|\dot{P}_{cmd}|$ values, integration will result in much more accurate values. Gentle braking can be considered any braking where the absolute value of the pressure command derivative, $\dot{P}_{cmd}$, is less than the maximum allowable rate of change for wheel brake pressure, for a given valve in an EHB braking system 12. At values of $|\dot{P}_{cmd}|$ that are less than a pre-specified amount, the estimators 50, 52 would be updated. A pre-specified amount could be any value that is less than the maximum pressure command derivative, $\dot{P}_{cmd}$, for a given valve. The pre-specified value could be fixed across the entire operating pressure range or can vary with pressure conditions. The pressure conditions that vary include the wheel brake pressure and the pressure differentials across a valve 18 or 26.

An additional reason for updating the estimators only at low $|\dot{P}_{cmd}|$ values is that, due to the physical dimensions of valve openings, there is a limit on the amount of fluid that can flow through an active valve, 18 or 26. As a result, if there is a large absolute value of $\dot{P}_{cmd}$ the active valve 18 or 26 may not be able to allow flow through the valve 18 or 26 at a rate that matches the demanded flow. As a result, the boundary adjustment will not be as accurate as when the updates take place during a lower flow demand event.

Unlike a spool valve where a bias on one side of the valve goes with the same amount of bias with the opposite polarity on the other side, the poppet valve has numerous combinations. It is demonstrated in FIG. 2 that both positive and negative modified pressure errors could exist with an over-compensated apply deadband, while a under-compensated apply deadband always leads to positive modified pressure error during pressure buildup. Therefore, it is possible to have a positive estimation result for an over-compensated apply deadband, but a positive estimation result would in turn aggravate the apply deadband over-compensation. As a result, there is a need for gain scheduling in the estimators 50, 52 to deal with this type of asymmetry in mapping from boundary deviation to modified pressure error.

Pressure differential related variations can be handled by using a well-given nominal boundary to reduce the amplitude and frequency of the deviations. Normally, deviations from the nominal boundary will vary over the entire pressure differential. In one embodiment, the entire boundary region is partitioned into many segments with one state variable assigned with each segment. The result of the estimation is stored in the state variable associated with the current segment. The values of state variables can be either directly used in computing control commands, or used in linear interpolation to avoid discontinuity between adjacent segments.

Figure 4B:
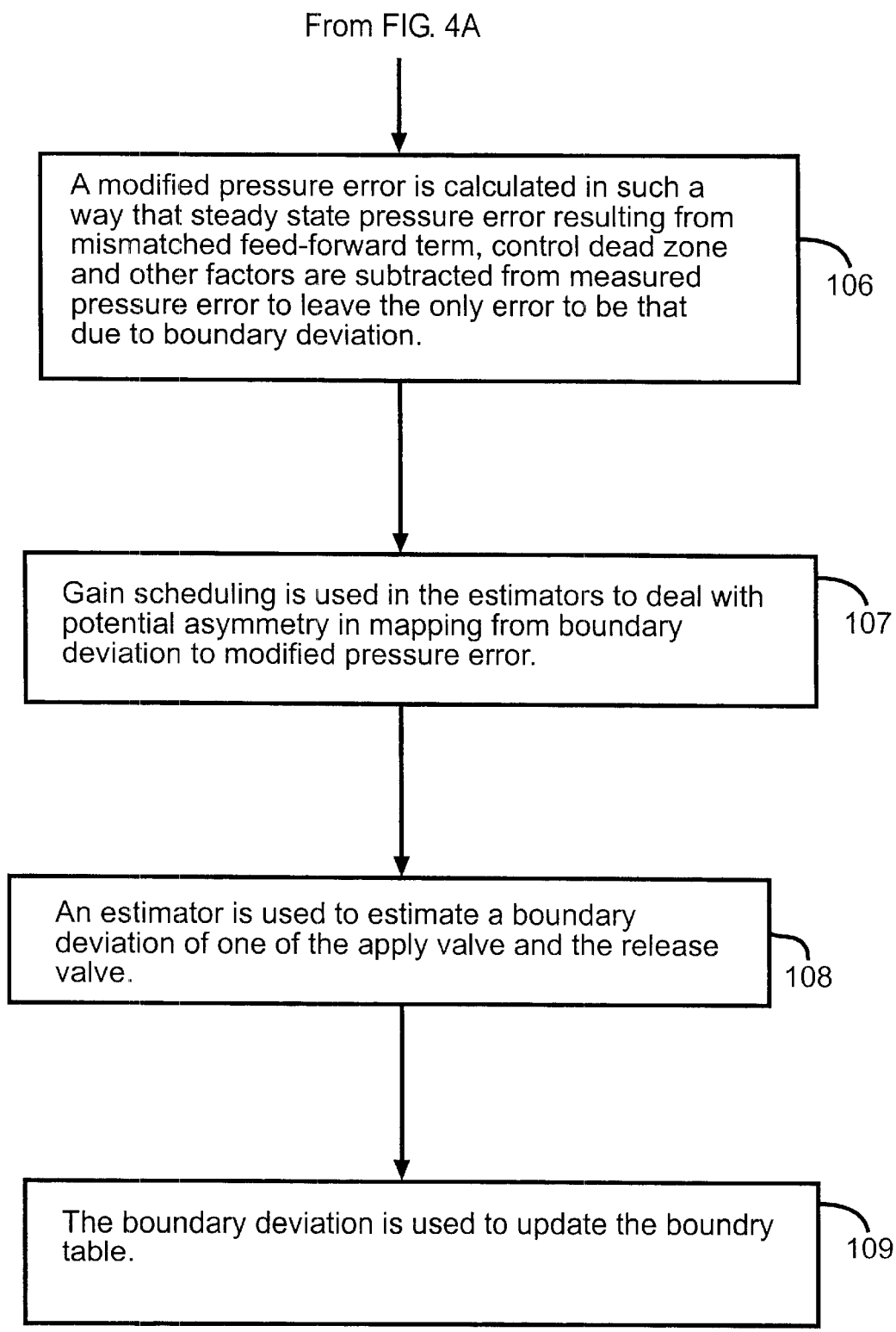
FIG. 4 is a block diagram representing the steps of the present invention.

As shown in FIGS. 4a and 4b, the proposed boundary self-adaptation scheme is therefore summarized as follows: (1) In a first step, 101, a pressure command signal is detected; (2) In a second step 102, a pressure command derivative over time is obtained; (3) In a third step, a pressure command derivative over time is preferably evaluated to determine whether a braking maneuver is gentle, (4) In a fourth step 104, the sign of the pressure command derivative over time is used to determine which estimator 50 or 52 should be updated, that is, the apply estimator 50 should be updated and the release estimator 52 should not when the pressure command derivative over time is positive and vice versa; (5) In a fifth step 105, a pressure error is calculated by subtracting an actual wheel brake pressure from the pressure command; (6) In a sixth step 106, a modified pressure error is calculated in such a way that steady state pressure error resulting from mismatched feedforward term, control deadzone and other factors are subtracted from measured pressure error to leave the only error to be that due to boundary deviation; (7) In a seventh step, 107, gain scheduling is used in the estimators 50, 52 to deal with potential asymmetry in mapping from boundary deviation to modified pressure error. (8) In an eighth step 108, an estimator 50 or 52 is used to estimate a boundary deviation of one of the apply valve 18 and the release valve 26; (9) In a ninth step 108, the boundary deviation is used to update the boundary table 46 or 48. Additionally, the whole pressure region can be partitioned into segments with one state variable associated with each segment, and the values of state variables are in turn used directly or indirectly in computing control command at corresponding segments. The above listed steps have been identified as occurring in a specific order. It is understood that these steps can be accomplished in any order without departing from the spirit or scope of the present invention.

The preferred embodiment has been described as using voltage controls. In that voltage is proportional to current, it is understood that the use of current controls is also within the scope of the claims of the present invention.

The principle and mode of operation of this invention have been explained and illustrated in its preferred embodiment. However, it must be understood that this invention may be practiced otherwise than as specifically explained and illustrated without departing from its spirit or scope. For instance, it can be applied with minor modifications to estimate the characteristic curves described in U.S. Pat. No. 6,086,167 to Heckmann, et al.

What is claimed is:

1. A method for adapting a closing boundary for a proportional poppet valve comprising:
   (a) detecting a pressure command signal;
   (b) obtaining a pressure command derivative over time;
   (c) using the sign of the pressure command derivative over time to determine which closing boundary should be updated;
   (d) obtaining a pressure error by subtracting an actual wheel brake pressure from its pressure command;
   (e) calculating a modified pressure error;
   (f) implementing the modified pressure error in the estimation;
   (g) implementing an estimator to estimate a boundary deviation of the valve; and
   (h) updating a boundary table using the resultant boundary deviation estimate.

2. The method defined in claim 1 wherein a gain scheduler is used for the estimator.

3. The method defined in claim 2 wherein the modified pressure error for a first valve has alternating signs that result from an over-compensated deadband and wherein the modified pressure errors with alternating signs give a negative boundary deviation estimate.

4. The method defined in claim 3 wherein the modified pressure error for a second valve has alternating signs that result from an over-compensated deadband and wherein the modified pressure errors with alternating signs give a positive boundary deviation estimate.

5. The method defined in claim 1 wherein the estimators are updated only during gentle braking maneuvers.

6. The method defined in claim 5 wherein gentle braking is braking where the absolute value of the pressure command derivative over time is less than a pre-specified value that further is less than the maximum allowable rate of change for wheel brake pressure for the valve.

7. The method defined in claim 6 wherein the pre-specified value is fixed across an entire operating pressure range for a braking system.

8. The method defined in claim 6 wherein the pre-specified value varies with pressure conditions.

9. The method defined in claim 8 wherein the pressure conditions comprise wheel brake pressure and pressure differential across the valve.

10. The method defined in claim 1 wherein a feedforward mismatch and a control deadzone are excluded from the pressure error.

11. The method defined in claim 1 wherein a first and second estimator are used to estimate boundary deviations of a first and second valve at each channel.

12. The method defined in claim 11 wherein the sign of the pressure command derivative over time is used to determine whether a first or second estimator is updated.

* * * * *